(12) United States Patent
Hyakutake et al.

(10) Patent No.: US 7,402,031 B2
(45) Date of Patent: Jul. 22, 2008

(54) PIECE FOR TIRE MOLD, METHOD OF PRODUCING THE PIECE, PIECE-TYPE TIRE MOLD AND METHOD OF PRODUCING THE PIECE-TYPE TIRE MOLD

(75) Inventors: Kiyoshi Hyakutake, Tokyo (JP); Hisatoshi Yamamoto, Tokyo (JP); Hiroshi Yoshida, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 0 days.

(21) Appl. No.: 10/513,468

(22) PCT Filed: May 23, 2003

(86) PCT No.: PCT/JP03/06461

§ 371 (c)(1), (2), (4) Date: Jul. 11, 2005

(87) PCT Pub. No.: WO03/099535

PCT Pub. Date: Dec. 4, 2003

(65) Prior Publication Data
US 2005/0248053 A1    Nov. 10, 2005

(30) Foreign Application Priority Data
May 23, 2002 (JP) ............... 2002-149279
Jul. 9, 2002 (JP) ............... 2002-199987

(51) Int. Cl.
  *B29C 33/10* (2006.01)
(52) U.S. Cl. .......................... 425/28.1; 425/46; 425/812

(58) Field of Classification Search ................. 425/28.1, 425/46, 812; 249/141
See application file for complete search history.

(56) References Cited

U.S. PATENT DOCUMENTS 3,840,971 A * 10/1974 McDonald .................. 164/456
4,553,918 A * 11/1985 Yoda et al. .................... 425/46
5,066,209 A    11/1991 Schmaderer et al.

(Continued)

FOREIGN PATENT DOCUMENTS

EP         0 753 419 A2       1/1997

(Continued)

OTHER PUBLICATIONS

Patent Abstracts of Japan, vol. 2000, No. 2, Feb. 29, 2000 (corresponds to JP 11-300746).

(Continued)

*Primary Examiner*—James Mackey
(74) *Attorney, Agent, or Firm*—Sughrue Mion, PLLC

(57) ABSTRACT

To form a fine slit having a width of 0.1 mm or less in each piece of a piece type tire mold, a plate-like shim member 44 having a width of 0.1 mm or less is inserted into a rubber mold 40A when a piece 40 is to be produced, a molten metal such as aluminum is injected into a plaster mold 40B to which the shim member 44 has been transferred and solidified to cast the piece 40, and the shim member 44 is removed from the piece 40 to which the shim member 44 has been transferred to form a slit having a width of 0.1 mm or less in the piece 40.

6 Claims, 8 Drawing Sheets

U.S. PATENT DOCUMENTS 5,800,642 A * 9/1998 Ohya .................. 425/812
5,866,171 A * 2/1999 Kata .................. 425/46
6,491,854 B1 * 12/2002 Sano .................. 425/812

FOREIGN PATENT DOCUMENTS

| EP | 1 066 941 A2 | | 1/2001 |
|---|---|---|---|
| JP | 51-144331 A | | 12/1976 |
| JP | 5-31563 A | | 2/1993 |
| JP | 5-138656 | * | 6/1993 |
| JP | 6-106540 | * | 4/1994 |
| JP | 7-223224 A | | 8/1995 |
| JP | 52-150329 A | | 12/1997 |
| JP | 10-264169 A | | 10/1998 |
| JP | 11-34060 | * | 2/1999 |
| JP | 11-188733 | * | 7/1999 |
| JP | 11-300746 | * | 11/1999 |

OTHER PUBLICATIONS

Patent Abstracts of Japan, vol. 017, No. 520, Sep. 20, 1993 to Bridgestone Corporation (Corresponds to JP 5-138656).

* cited by examiner

FIG. 12 (a) PRIOR ART
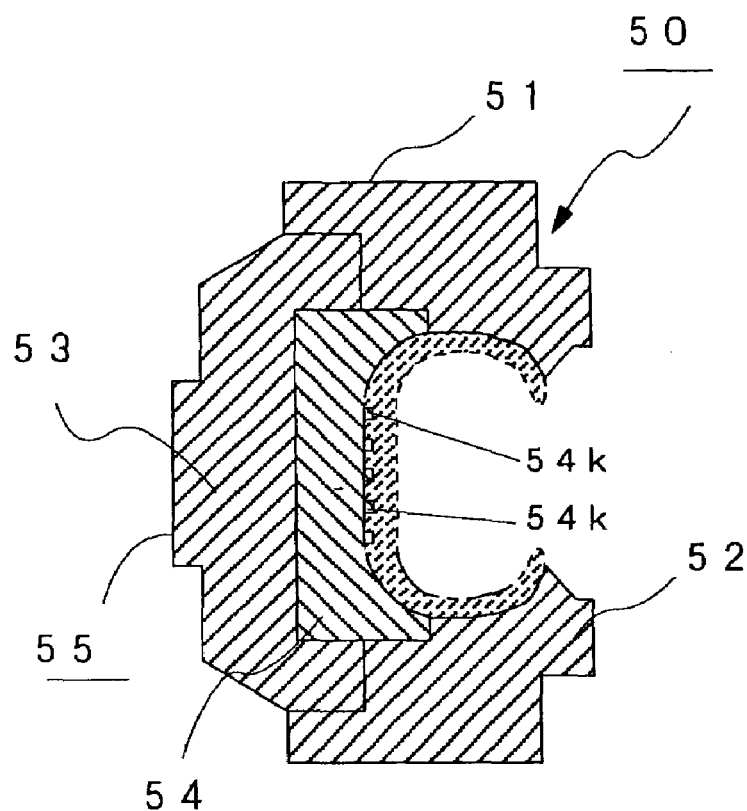
FIG. 12 (b) PRIOR ART
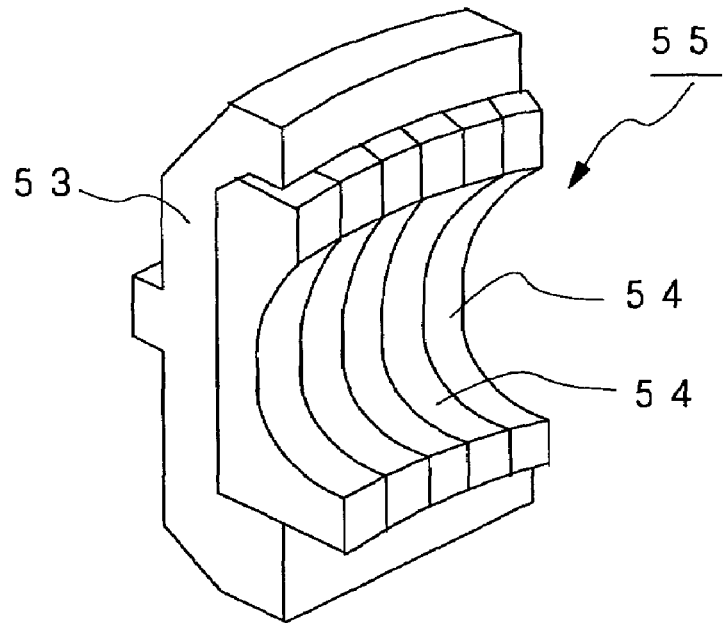

PIECE FOR TIRE MOLD, METHOD OF PRODUCING THE PIECE, PIECE-TYPE TIRE MOLD AND METHOD OF PRODUCING THE PIECE-TYPE TIRE MOLD

BACKGROUND OF THE INVENTION

1. Field of the Invention

The present invention relates to a tire mold for vulcanizing and molding a tire and, particularly, to a piece type tire mold comprising a plurality of pieces for forming a tread pattern on a side in contact with the tread forming portion of a tire and a method of producing the same.

2. Description of the Prior Art

To form a tire, a vulcanizing mold (to be referred to as "tire mold" hereinafter) is used in which pressure is applied to the inside of the molded green tire to pressure contact the outer surface of the above green tire to the inner wall of the heated mold in order to vulcanize the crude rubber by heat and pressure. One of such tire molds is a piece type tire mold 50 shown in FIGS. 12(A) and 12(B) (as disclosed by Japanese Laid-open Patent Application No. 11-198145). This tire mold 50 comprises upper and lower molds 51 and 52 in contact with a tire side portion and a sector mold 55 which consists of a holder 3 and a plurality of pieces 54 fixed to the holder 53 and arranged in the circumferential direction of the tire. A plurality of projections 54k for forming the tread pattern of the tire are formed on the inner sides of the above pieces 54.

Several types of the pieces 54 are prepared according to the tread pattern of a tire and generally produced by a die cast method for pouring a molten metal into a metal mold at a high temperature and a high pressure and casting it. They are machined to a required size, combined together based on the above tread pattern and fitted in the above holder 53.

However, in the above die cast method, equipment becomes bulky and the cast product cannot be removed from the mold when an undercut or complex blade is buried in the pieces.

In the piece type tire mold 50 having the above constitution, in order to discharge air and gas produced during vulcanization to the outside of the mold, air vent through holes called "vent holes" are formed in the above piece 54 for air ventilation. However, a rubber material enters the above vent holes during the vulcanization and molding of a tire, and a large number of projections called "spew" are formed on the surface of the tire. Therefore, the work of removing these spews is required after molding. There is proposed a spewless mold (as disclosed by Japanese Laid-open Patent Application No. 4-223108) in which back blocks obtained by dividing the tread pattern of a tire for each pitch are assembled together and air is discharged to the outside of the mold through a gap between adjacent back blocks without forming vent holes. However, the above spewless mold has problems that it is difficult to ensure appropriate air ventilation at an appropriate position and that air ventilation cannot be carried out completely in a portion far from the above gap.

Then, it is conceivable that a fine slit which communicates with the piece dividing face is formed in each piece to facilitate air ventilation from a gap between pieces or that a slit communicating with a vent hole on the rear side of each piece is formed to escape air from a portion other than the gap between pieces. However, it is difficult to form a slit having a width of 0.1 mm or less in the piece mechanically and it is troublesome to form a slit because an obstacle to processing such as a blade or groove is existent on the tire inner side of the piece.

For example, milling has limits in the strength of a cutter and milling depth because the width of a slit to be machined is very small and takes a long time. Therefore, it is not practical.

Discharge processing requires the manufacture of electrodes and has a limit in processing depth due to restrictions such as the removal of chips and electrode curvature.

Laser processing making use of laser light from a $CO_2$ laser or YAG laser has a limit in processing depth from the relationship with the focusing distance of laser light when the width of a groove is 0.1 mm or less.

It is an object of the present invention which has been made in view of the above problems of the prior art to provide a method of producing a tire mold piece, which is capable of producing a piece accurately even when it has a complex shape and of forming a slit having a width of 0.1 mm or less in the piece easily as well as a piece type tire mold which comprises a plurality of the pieces.

SUMMARY OF THE INVENTION

According to a first aspect of the invention, there is provided a tire mold piece used in a piece type tire mold having a plurality of the pieces arranged on a side in contact with the tread forming portion of a tire and having a silt open to the inner side of the mold, wherein one end of the slit contacts the piece dividing face of the mold and the other end thereof is located in a portion corresponding to the land portion of the tire defined by a projection or blade forming a tire pattern.

According to a second aspect of the invention, there is provided a tire mold piece, wherein the other end of the slit is situated in the vicinity of the projection or blade forming a tire pattern.

According to a third aspect of the invention, there is provided a tire mold piece, wherein the other end of the silt is situated at a corner between the projection and the blade.

According to a fourth aspect of the invention, there is provided a tire mold piece, wherein the other end of the slit is located 10 mm or more away from the piece dividing face of the mold.

According to a fifth aspect of the invention, there is provided a tire mold piece used in a piece type tire mold having a plurality of pieces arranged on a side in contact with the tread forming portion of a tire and having a silt open to the inner side of the mold, wherein both end portions of the slit are situated in a portion corresponding to the land portion of a tire defined by a projection or blade forming a tire pattern.

According to a sixth aspect of the invention, there is provided a tire mold piece, wherein both end portions of the silt are situated in the vicinity of the projection or blade forming a tire pattern.

According to a seventh aspect of the invention, there is provided a tire mold piece, wherein the slit is extended to the rear side of the piece.

According to an eighth aspect of the invention, there is provided a piece type tire mold for vulcanizing and molding a tire, having a plurality of pieces on a side in contact with the tread forming portion of a tire, wherein the tire mold piece according to any one of the first to seventh aspects is used.

According to a ninth aspect of the invention, there is provided a method of producing a piece for use in a piece type tire mold having a plurality of the pieces arranged on a side in contact with the tread forming portion of a tire, comprising the steps of:

inserting a plate-like shim member made from metal different from the base material of the piece into a rubber mold;

injecting the molten base material into a plaster mold to which the shim member has been transferred and solidifying it to cast the piece, and removing the shim member from the piece to which the shim member has been transferred to form a slit in the piece.

According to a tenth aspect of the invention, there is provided a method of producing a piece, wherein the shim member is directly inserted into the plaster mold into which the molten metal is cast.

According to an eleventh aspect of the invention, there is provided a method of producing a piece, wherein the thickness of the shim member is 0.1 mm or less.

According to a twelfth aspect of the invention, there is provided a method of producing a piece for use in a piece type tire mold having a plurality of the pieces arranged on a side in contact with the tread forming portion of a tire, wherein the piece is cast using a plaster mold, and thin linear air vent grooves are formed in the top surface of the plaster mold.

According to a thirteenth aspect of the invention, there is provided a method of producing a piece, wherein thin linear air vent grooves are formed in the face opposed to the plaster mold of a top plate in contact with the top surface of the plaster mold during casting.

According to a fourteenth aspect of the invention, there is provided a method of producing a piece, wherein the face opposed to the plaster mold of the top plate in contact with the top surface of the plaster mold during casting is subjected to a blast treatment.

According to a fifteenth aspect of the invention, there is provided a method of producing a piece wherein at least two dams are formed in the plaster mold to inject molten aluminum from the lower portion of the plaster mold through the dams at a low pressure.

According to a sixteenth aspect of the invention, there is provided a method of producing a piece, wherein two dams are formed on both sides where the tread portion of a tire contacts the mold of the plaster mold to inject molten aluminum into the mold from two directions.

According to a seventeenth aspect of the invention, there is provided a method of producing apiece, wherein a dam is formed in both end portions of the plaster mold to inject molten aluminum into the mold from two directions.

According to an eighteenth aspect of the invention, there is provided a method of producing a piece type tire mold by arranging a plurality of pieces produced by the method according to any one of the ninth to seventeenth aspects in the circumferential direction of a tire.

According to a nineteenth aspect of the invention, there is provided a piece type tire mold for vulcanizing and molding a tire, having a plurality of pieces on a side in contact with the tread forming portion of a tire, wherein the pieces produced by the method according to any one of the ninth to seventeenth aspects are used.

BRIEF DESCRIPTION OF THE DRAWINGS

FIGS. 12(a) and 12(b) are diagrams showing the constitution of a piece type tire mold of the prior art.

DETAILED DESCRIPTION OF THE PREFERRED EMBODIMENTS

Preferred embodiments of the present invention will be described hereinbelow with reference to the accompanying drawings.

Embodiment 1

Figure 1:
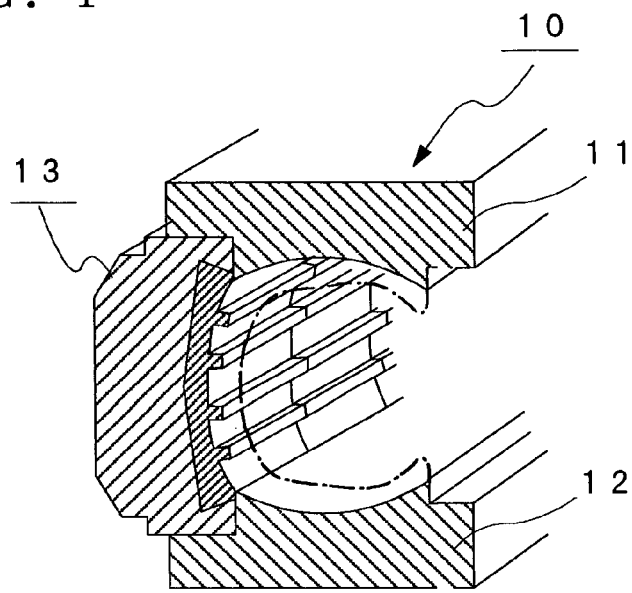
FIG. 1 is a diagram showing the constitution of a piece type tire mold according to Embodiment 1 of the present invention.
Figure 2:
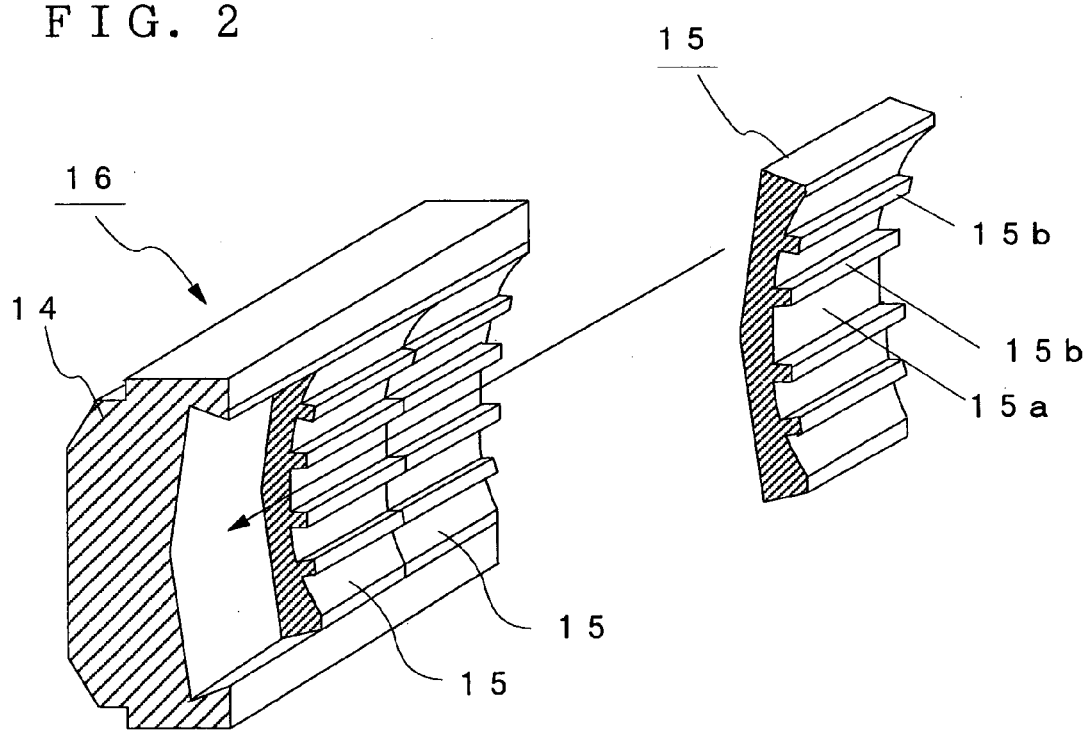
FIG. 2 is a diagram showing the constitution of a sector mold according to Embodiment 1.

FIG. 1 shows the constitution of a piece type tire mold 10 according to a preferred embodiment of the present invention. In FIG. 1, reference numerals 11 and 12 denote upper and lower molds in contact with a tire side portion and 13 a tread pattern forming portion interposed between the above upper and lower molds 11 and 12. This tread pattern forming portion 13 is composed of a plurality of sector molds 16 arranged in the circumferential direction of a tire, each consisting of a holder 14 and a plurality of pieces 15 mounted to the inner side of the holder 14, each piece 15 has a substantially arcuate cut-out portion 15a on the tire side, and a plurality of projections 15b for forming the tread patter of the tire are formed on the surface of the cut-out portion 15a. In this embodiment, the above piece is manufactured by pouring aluminum into a disintegration type plaster mold in accordance with a low-pressure cast method. The above manufactured pieces 15 are combined together based on the tread pattern of a tire to be vulcanized and mounted to the holder 14 to produce the sector mold 16 which is then assembled with the upper and lower molds 11 and 12 so as to manufacture the piece type tire mold 10.

Figure 3:
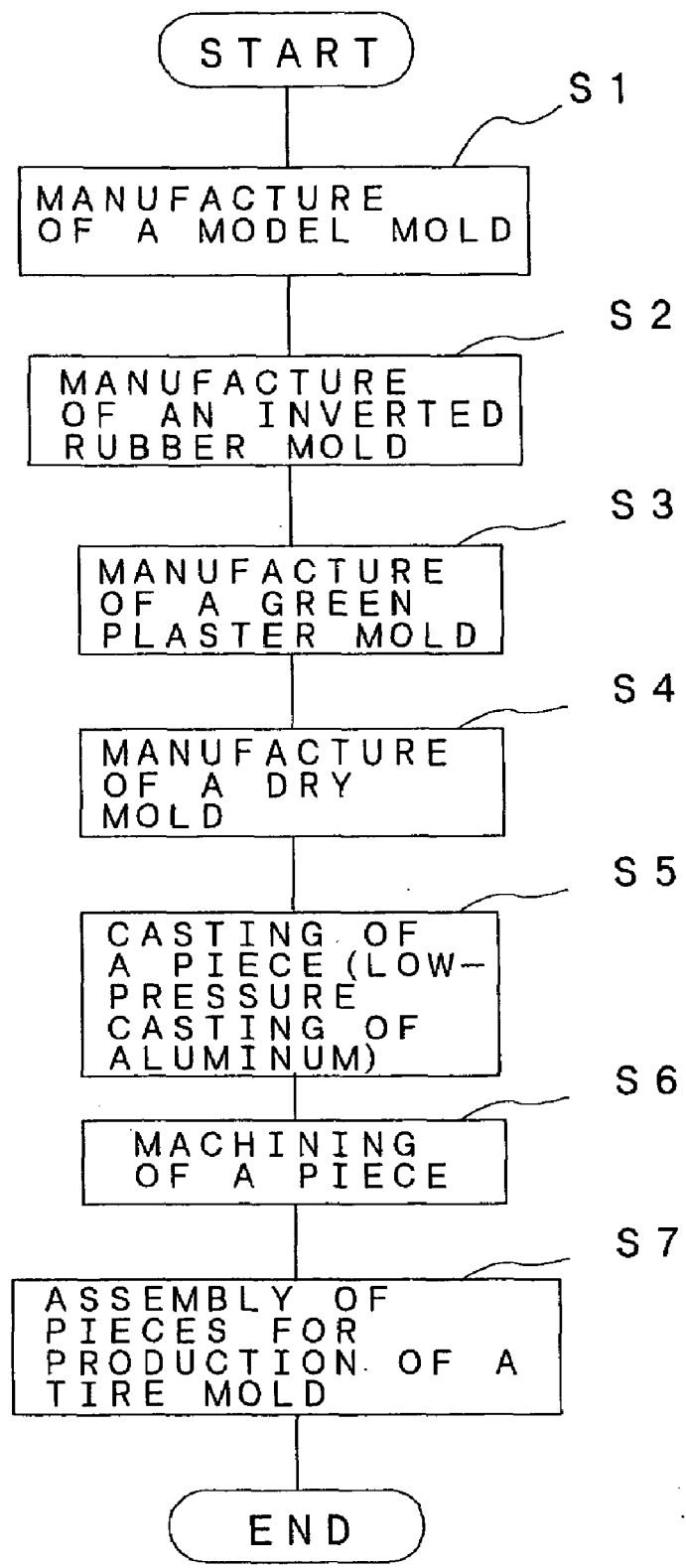
FIG. 3 is a flow chart showing the method of producing a piece type tire mold according to the present invention.

The method of manufacturing the piece type tire mold 10 will be described with reference to the flow chart of FIG. 3.

A master model (model mold) for making a plaster mold is first manufactured based on the plan of a piece to be manufactured (step S1). At this point, a material which is relatively easily machined (such as Chemiwood) is used to minimize a machining load, and only necessary parts are machined by an NC machine tool and preferably set in an aluminum mold called "common core frame" to produce a model mold. The model mold may be machined as an integrated mold.

A liquid rubber is poured into the above model mold and solidified to manufacture an inverted rubber mold (original mold) (step S2). To form thin grooves in the piece like the cut-out portions (sipe) of a tire, a metal (mainly stainless steel) portion called "blade" is buried in the above rubber mold.

Foamed plaster, non-foamed plaster or a mixture of foamed plaster and non-foamed plaster is poured into the above rubber mold as a slurry and reacted to manufacture a green plaster mold (step S3) which is then dried to remove crystal water from the green mold in order to manufacture an anhydrous dry mold (plaster mold) (step S4).

Figure 4:
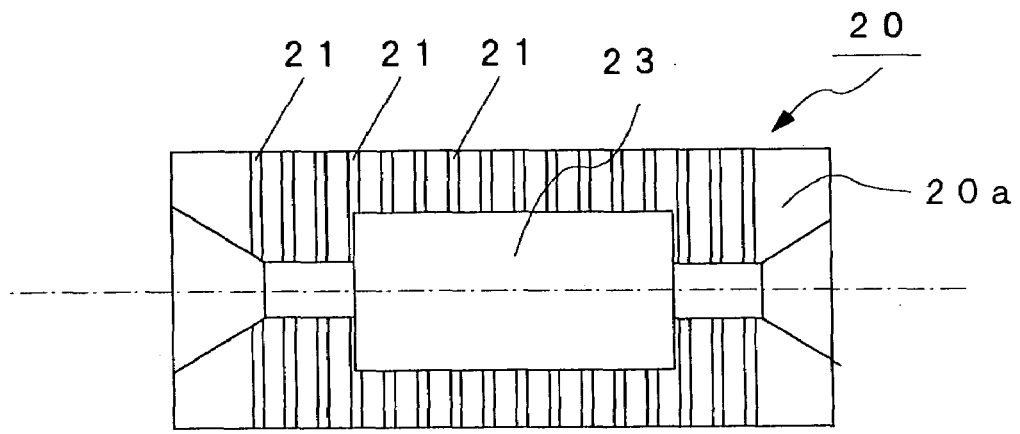
FIGS. 4(a), 4(b), and 4(c) are diagrams of a plaster mold according to Embodiment 1.
Figure 4:
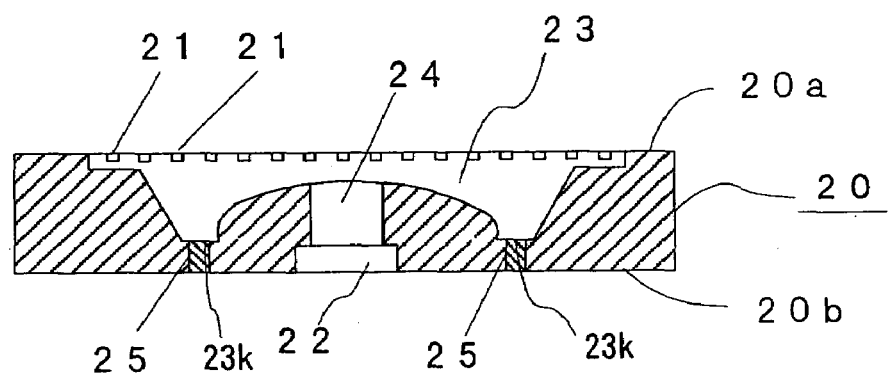
Figure 4:
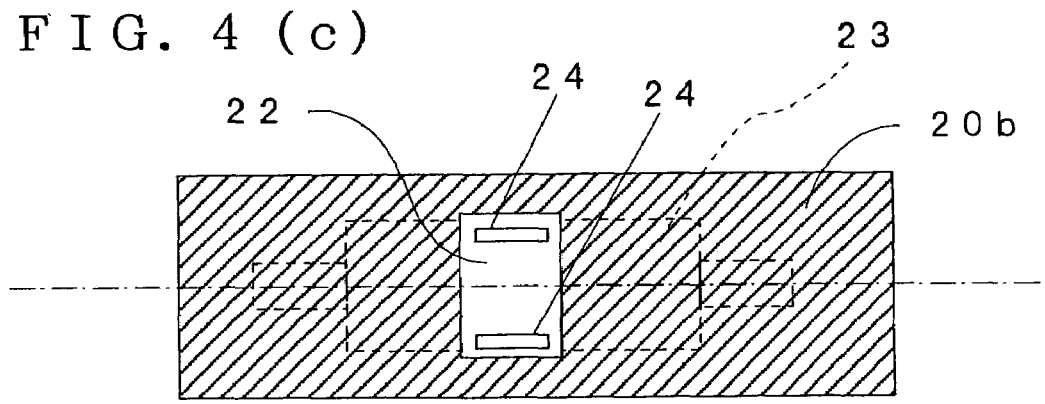

FIGS. 4(A) to 4(C) show an example of the manufactured plaster mold. FIG. 4(A) is a top view, FIG. 4(B) is a side sectional view and FIG. 4(C) is a bottom view. A plurality of thin linear air vent grooves 21 extending in the width direction (circumferential direction of a contacting tire) are formed in the peripheral portion of the top surface 20a of the plaster mold 20, and two dams 24 and 24 which communicate with a molten metal pool portion 22 and a gap 23 are formed in the under surface 20b. The dams 24 and 24 are formed at positions symmetrical to the center in the longitudinal direction of the above plaster mold 20 in a molten metal passage extending in the longitudinal direction (width direction of the tire in contact with the mold) of the plaster mold 20. Reference numerals 25 and 25 are chillers placed in contact with the lowermost portions 23k (portions in contact with the tire tread groove portions of the piece 15) of the above gap.

A piece is cast using the above plaster mold 20 (step S5). Since the mold is made from plaster, a low-pressure cast method (0.1 to 0.5 kg/cm$^2$) or gravity cast method is preferably used in view of restrictions from the strength of the mold.

Figure 5:
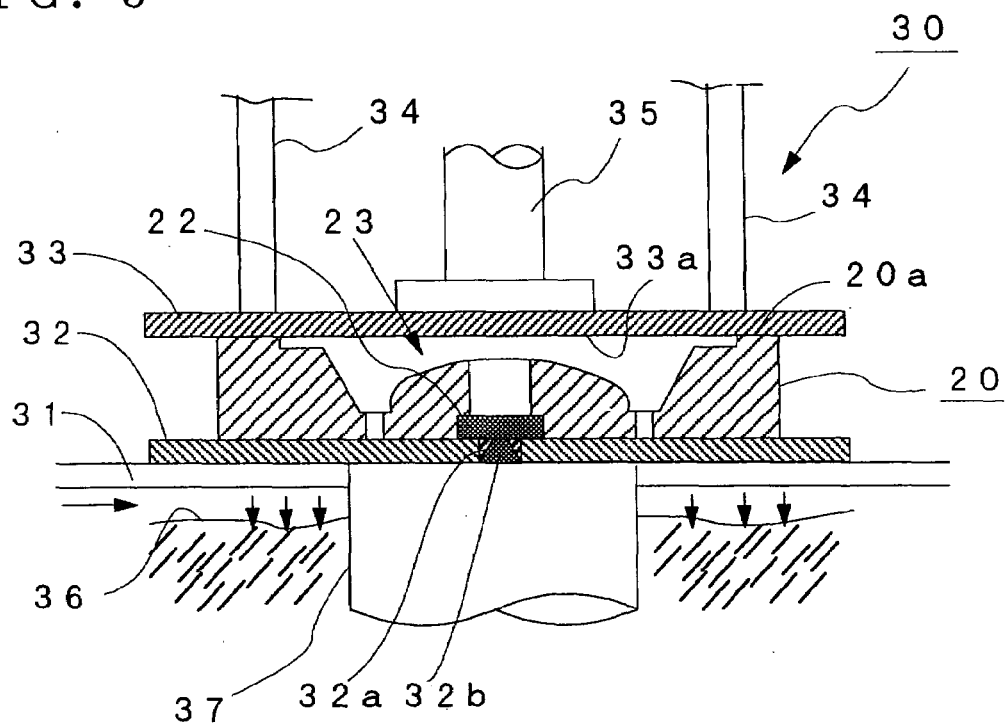
FIG. 5 is a diagram showing a low-pressure casting machine according to Embodiment 1.

FIG. 5 is a sectional view of a key section showing that the plaster mold 20 is set in a low-pressure casting machine 30. The plaster mold 20 is placed on a base iron plate 32 mounted on a furnace body frame 31 holding an unshown molten metal crucible. More specifically, the above plaster mold 20 is placed on the above base iron plate 32 in such a manner that the center of its molten metal pool portion 22 is located at a position corresponding to a gate 32b surrounded by a reseparable plate 32a. A top iron plate 33 is contacted to the top surface 20a of the above plaster mold 20. Since the above top iron plate 33 is movably mounted to guide members 34 and 34 which are interposed between the above base iron plate 32 and an unshown upper frame and arranged parallel to each other, a pressure cylinder 35 is activated to lower the top iron plate 33 along the guide members 34 and 34 in order to contact the under surface 33a of the above top iron plate 33 to the top surface 20a of the plaster mold 20, thereby forming a cavity with the under surface 33a of the top iron plate 33 and the gap 23 of the plaster mold 20.

Then, compressed air is supplied into the molten metal crucible so that molten aluminum 36 in the above crucible is injected into the plaster mold 20 from a stalk 37 through the gate 32b by the pressure (0.1 to 0.5 kg/cm$^2$) of this compressed air and solidified.

Thereafter, the above top iron plate 33 is lifted by the above cylinder 35 to take out the plaster mold 20, and the plaster mold 20 is destroyed to take out the cast piece 15.

In the plaster mold 20 of this embodiment, two dams are formed to inject the above molten aluminum 36 into the above cavity from two directions as described above, thereby making it possible to inject the molten aluminum efficiently and uniformly.

In this embodiment, a large number of air vent grooves 21 are formed in the peripheral portion of the top surface 20a of the plaster mold 20 so that air ventilation can be carried out fully during casting. Therefore, the formation of a cavity caused by the residual air is almost eliminated and the dimensional accuracy of the piece 15 can be improved.

The above piece 15 taken out from the plaster mold 20 is finished to a required size (step S6) and combined with other pieces according to the tread pattern to produce the sector mold 16 which is then assembled with the upper and lower molds 11 and 12 to obtain a piece type tire mold 10 (step S7).

The machining of the above piece 15 is carried out by shaping the rear side (to be referred to as "rear barrel"; the holder 14 side) of a product as a reference plane on a lathe and processing it to a required size on the basis of the rear barrel.

In this Embodiment 1, since the piece 15 used in the sector mold 16 of the piece type tire mold 10 is cast using the disintegration type plaster mold 20 and a large number of thin linear air vent grooves 21 are formed in the top surface 20a of the plaster mold 20, a piece having an undercut or complex blade buried therein can be easily manufactured and also air ventilation can be easily carried out from the above air vent grooves during casting, thereby making it possible to improve the surface accuracy of the piece 15.

Further, as the two dams 24 and 24 are formed in the above plaster mold 20 to inject molten aluminum into the above plaster mold 20 from two directions, the molten aluminum can be injected into the plaster mold 20 efficiently and uniformly.

Figure 6:
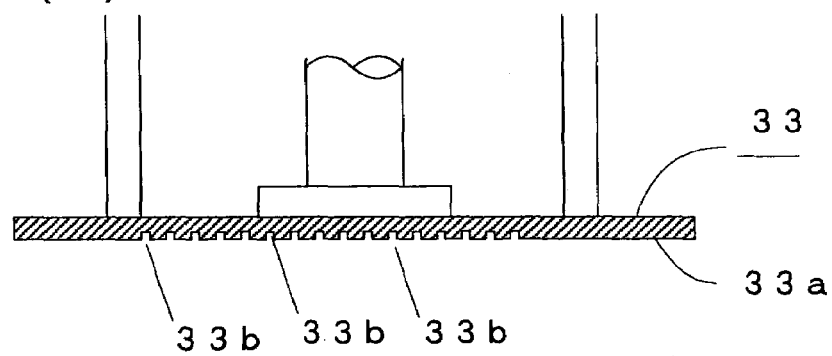
FIGS. 6(a) and 6(b) are diagrams of a top plate according to Embodiment 1.
Figure 6:
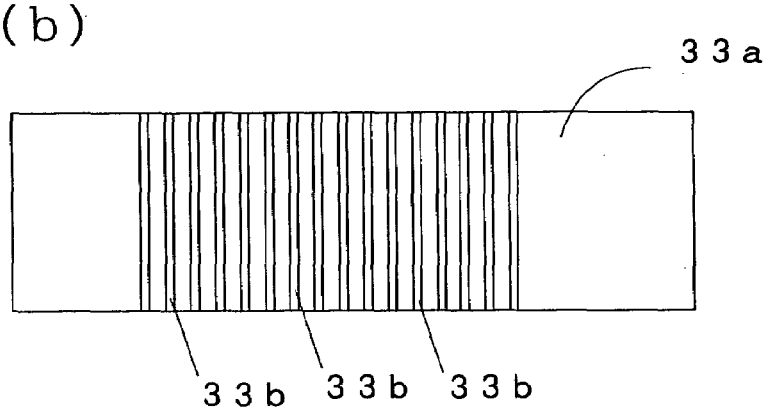

In the above Embodiment 1, a large number of air vent grooves 21 are formed in the top surface 20a of the plaster mold 20 for air ventilation during casting. As shown in FIGS. 6(A) and 6(B), thin linear air vent grooves 33b may be formed in the under surface 33a of the top iron plate 33 which is contacted to the top surface 20a of the plaster mold 20. Alternatively, an air vent passage may be formed between the top surface 20a of the plaster mold 20 and the under surface 33a of the top iron plate 33 by subjecting the above under surface 33a to a blast treatment.

Figure 7:
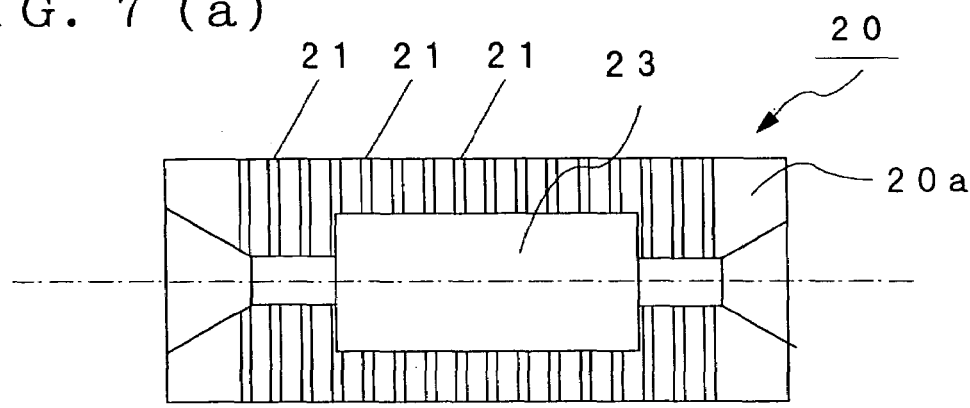
FIGS. 7(a), 7(b), and 7(c) are diagrams of another example of the plaster mold according to the present invention.
Figure 7:
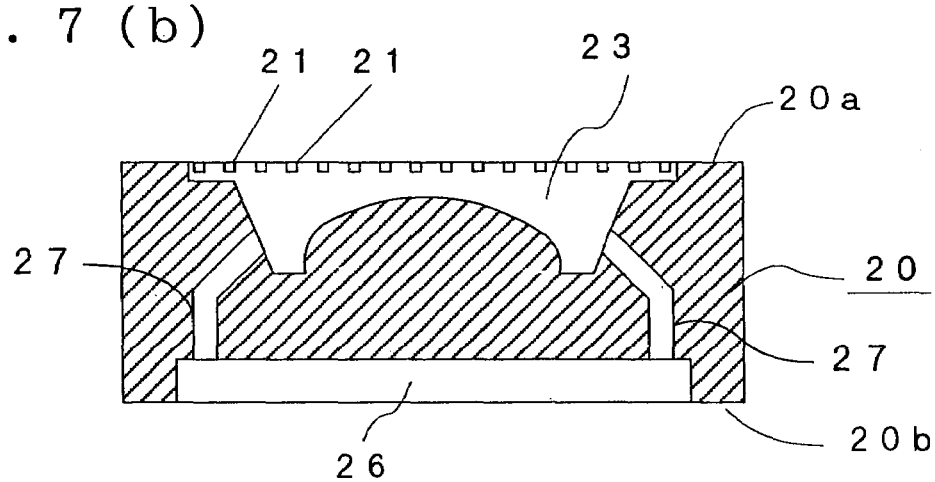
Figure 7:
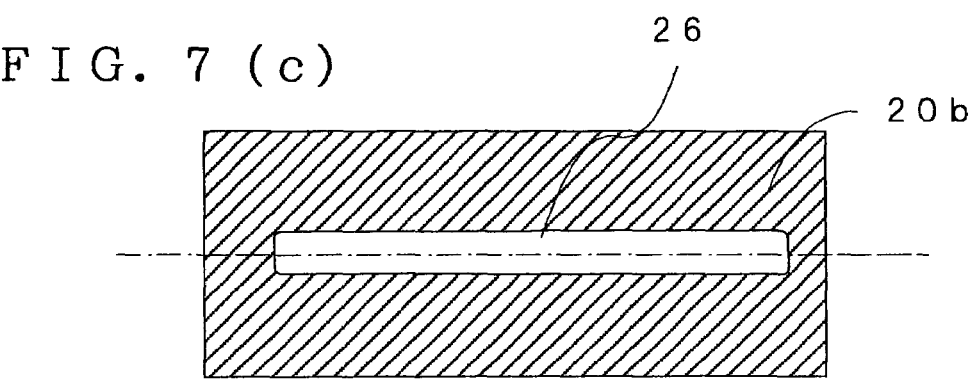

In the above embodiment, the two dams 24 and 24 are formed in the under surface 20b of the above plaster mold 20 to inject molten aluminum into the plaster mold 20 from two directions. As shown in FIGS. 7(A) to 7(C), a molten metal pool portion 26 extending from one end to the other end in the longitudinal direction of the plaster mold 20 may be formed in the under surface 20b of the plaster mold 20, and dams 27 and 27 communicating with the above molten metal pool portion 26 and the gap 23 may be formed on both side of the molten metal pool portion 26 to inject molten aluminum into the above plaster mold 20 from two directions. In this case, the molten aluminum can be injected into the plaster mold 20 efficiently and uniformly.

Embodiment 2

Figure 8:
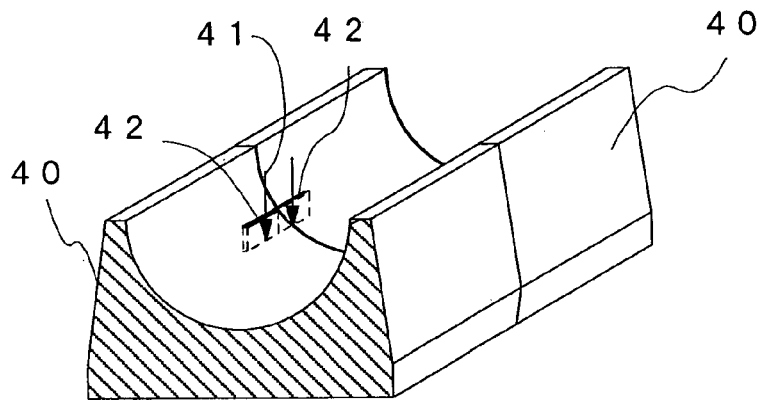
FIG. 8 is a diagram of an air vent structure in a piece type tire mold according to Embodiment 2.

In the above Embodiment 1, the piece 15 used in the sector mold 16 of the piece type tire mold 10 is cast using the disintegration type plaster mold 20. As shown in FIG. 8, slits 42 and 42 having a width of 0.1 mm or less, or 0.05 mm or less are formed in the vicinity of a piece dividing plane 41 which is the interface between aluminum pieces 40 and 40 to introduce a gas generated at the time of vulcanizing a tire into the piece dividing plane 41 from the above slits 42 and 42 and escape it to the outside of the mold. Thereby, a spewless piece type tire mold which facilitates air ventilation with a simple structure can be obtained.

A description is subsequently given of the method of manufacturing a piece of the present invention.

Based on the plan of a piece to be manufactured, a rubber mold 40A shown in FIG. 9(A) is first manufactured. A cut-out portion 43 is formed in the vicinity of the piece dividing face 41A of the above rubber mold 40A, preferably at a position in contact with the piece dividing face 41A, and a plate-like shim member 44 made from metal different from aluminum which is the material of the above piece 40 is inserted into this cut-out portion 43. To carry out air ventilation efficiently, the depth of the above slit 42 is preferably 3 mm or more, more preferably 5 mm or more. In this embodiment, the insertion depth of the above shim member 44 is set to 5 mm or more.

Figure 9:
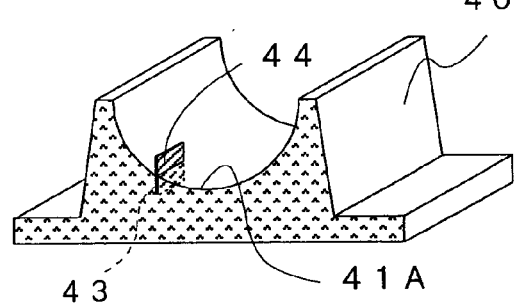
FIGS. 9(a), 9(b), 9(c), and 9(d) are diagrams showing the method of producing a piece according to Embodiment 2.
Figure 9:
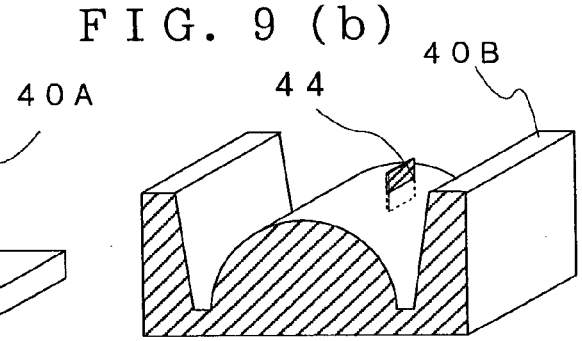
Figure 9:
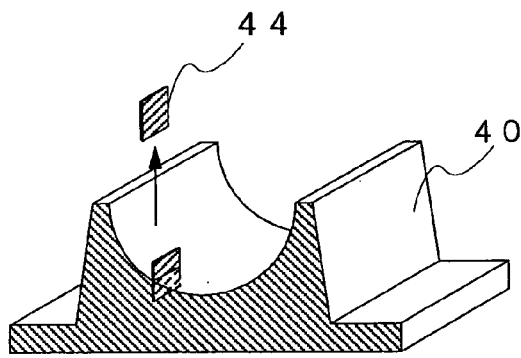
Figure 9:
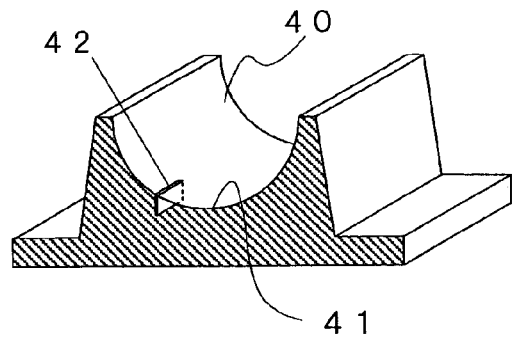

After foamed plaster, non-foamed plaster or a mixture of foamed plaster and non-foamed plaster is poured into the above rubber mold 40A as a slurry and reacted to manufacture a green plaster mold, this plaster mold is dried to manufacture a (inverted) plaster mold 40B as shown in FIG. 9 (B). The shim member 44 inserted into the above rubber mold 40A is transferred to the above plaster mold 40B.

Molten aluminum is then poured into the above plaster mold 40B to manufacture an aluminum piece (mold) 40 as shown in FIG. 9(C), and the shim member 44 transferred to the above plaster mold 40B is transferred to the aluminum piece 40. After casting, a slit 42 having a small width of 0.1 mm or less, or 0.05 mm or less as shown in FIG. 9(D) can be formed in the vicinity of the piece dividing face 41 of the above aluminum piece 40 by removing the above shim member 44 from the above aluminum piece 40. Since this slit 42 has a small width, air can be ventilated but there is no entry of rubber, whereby the production of irregularities on the surface of a tire after vulcanization can be suppressed.

Figure 10:
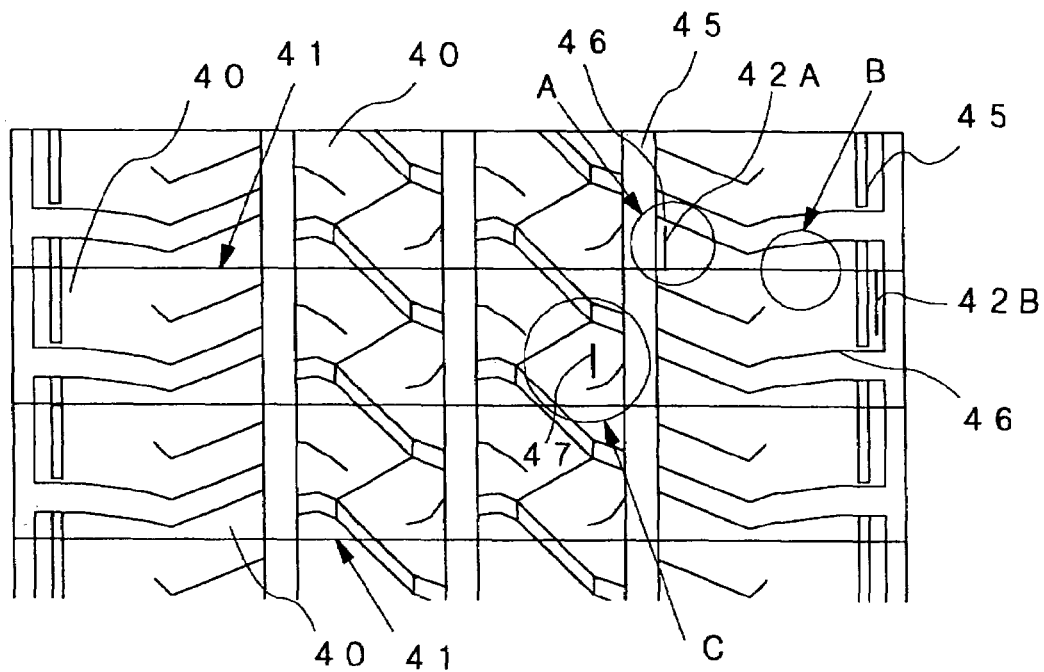
FIG. 10 is a plan view showing the position of a slit in the piece type tire mold according to Embodiment 2.

The above slit 42 may be a slit 42A or slit 42B which is defined by a projection 45 or a blade 46 forming a tire pattern, extends from a portion corresponding to the tire land portion of the above piece 40 to the piece dividing face 41 and has one end in contact with the piece dividing face 41 as shown in the area A of FIG. 10. The slit such as the above slit 42A or 42B is preferably formed at a position where air is hardly ventilated, such as a position in the vicinity of the projection 45 or the blade 46 forming the tire pattern, more preferably at a corner between the projection 45 and the blade 46. When the above slit 42A or 42B is thus formed in the aluminum piece 40, air ventilation can be carried out efficiently.

The slit 42 in contact with the above piece dividing face 41 may be located 10 mm or more away from the piece dividing face 41. For example, it is desired that the slit should not be formed in a portion where air is relatively easily ventilated, close to the piece dividing face 41, even when it is in the vicinity of the blade 46 as shown in the area B of FIG. 10. When slits are formed only in portions where air is hardly ventilated and which are 10 mm or more away from the piece dividing face 41 and no slit is formed in a portion where air is easily ventilated, the number of slits can be minimized, thereby making it possible to minimize a reduction in the stiffness of the aluminum piece 40.

The method of producing a piece according to the above Embodiment 1 is preferably used for the manufacture of the aluminum piece 40 using the above plaster mold 40B.

In this Embodiment 2, after the plate-like shim member 44 having a width of 0.1 mm or less, or 0.05 mm or less is inserted into the plaster mold 40B into which molten aluminum is poured or the rubber mold 40A which is the original mold of the above plaster mold 40B to manufacture the aluminum piece 40, the above shim member 44 is removed to form the slit 42 having a width of 0.1 mm or less, or 0.05 mm or less. Therefore, the slit 42 having a predetermined depth can be formed without paying special attention to an obstacle to processing, such as a blade or groove formed on the tire inner side of the above piece 40.

A spewless piece type tire mold having fine slits 42 for air ventilation in the piece dividing faces 41 can be easily obtained by using the above aluminum pieces 40.

In the above Embodiment 2, slits 42 and 42 are formed in the piece dividing faces 41 of adjacent aluminum pieces 40 and 40. A slit 42 may be formed only in one of the aluminum pieces 40.

Figure 11:
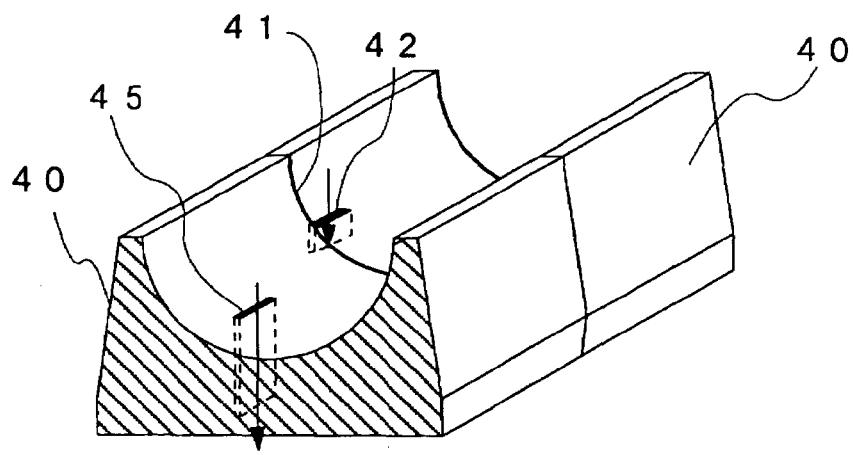
FIG. 11 is a diagram showing an air vent structure in the piece type tire mold of the present invention.

Alternatively, as shown in FIG. 11, a slit 47 may be formed in almost the center portion of the aluminum piece 40 through to the rear side of the piece 40 to communicate with an unshown vent hole formed in the rear side of the piece 40, thereby making it possible to further enhance ventilation efficiency. When the slit 47 is formed through to the rear side of the piece 40, the end portion of the slit 47 does not need to be extended to the piece dividing face 41. To minimize the length of the slit, its both end portions are preferably located in the vicinity of the projection or blade forming the tire pattern. More specifically, when the slit 47 extending to the rear side of the piece 40 is formed in a portion where air is hardly ventilated, surrounded by the projection 46 or the blade 46 forming the tire pattern, as shown in the area C of FIG. 10, air ventilation can be carried out more efficiently.

The slit 42 formed at a position in contact with the piece dividing face 41A, such as the above slit 42A or slit 42B, does not need to be extended to the rear side of the piece 40.

In the above embodiment, straight groove-like slits 42 and 47 are formed using the plate-like shim member 44. Not only a linear slit but also a curved slit such as a wavy slit may be formed by suitably changing the thickness and shape of the shim member.

In the above embodiment, the base material of the piece is aluminum. The present invention is not limited to this. When the plaster mold 40B is used as in this embodiment, aluminum or a light alloy containing aluminum as a base material is preferably used.

In the above embodiment, plaster is used as the material of the mold for transferring the shim member 44. The present invention is not limited to this. For example, a material capable of inserting or transferring the above shim member, such as high-hardness urethane, may be used to manufacture a mold corresponding to the above plaster mold 40.

INDUSTRIAL FEASIBILITY

As having been described above, according to the present invention, in order to manufacture a piece type tire mold having a plurality of sector molds, each comprising a plurality of pieces having projections for forming the tread pattern of a tire on a side in contact with the tire surface and arranged in the circumferential direction of the tire, between upper and lower molds in contact with the side portion of the tire, the above pieces are cast using a plaster mold. Therefore, the pieces can be manufactured accurately even for a tire mold which requires pieces having a complex shape, and a tire mold having high dimensional accuracy can be obtained.

In order to manufacture the above piece, the plate-like shim member made from metal different from the base material of the above piece is inserted into the rubber mold, the molten base material is poured into the plaster mold to which the shim member has been transferred and solidified to cast a piece, and the above shim member is removed from the piece to which the above shim member has been transferred to form a slit in the piece. Therefore, a slit having a predetermined depth or a slit extending through the piece can be freely formed.

A spewless piece type tire mold capable of easily carrying out air ventilation with a simple structure can be obtained by using a piece having a slit communicating with the piece dividing face of the mold or a piece having a slit communicating with a vent hole formed in the rear side of the piece of the mold and manufactured by the above method.

What is claimed is:

1. A tire mold piece used in a piece type tire mold having a plurality of tire mold pieces arranged circumferentially to form a tread forming portion of a tire to be formed, the tire mold piece comprising:
a slit open to an inner side of the plurality of tire mold pieces facing the tire to be formed,
wherein one end of the slit ends at a piece dividing face of one of the plurality of tire mold pieces between adjacent tire mold pieces and an other end thereof is located in a portion corresponding to a land portion of the tire to be formed and defined by a projection or a blade adapted to form a tire pattern, wherein the other end of the slit is bounded by the tire mold piece, wherein the width of the slit is equal to or less than 0.1 mm.

2. The tire mold piece according to claim 1, wherein the other end of the slit is situated in the vicinity of the projection or blade forming a tire pattern.

3. The tire mold piece according to claim 1, wherein the other end of the slit is situated at a corner between the projection and the blade.

4. The tire mold piece according to any one of claims 1 to 3, wherein the other end of the slit is located 10 mm or more away from the piece dividing face of the tire mold piece.

5. A tire mold piece used in a piece type tire mold having a plurality of the pieces arranged on a side in contact with the tread forming portion of a tire and having a slit open to an inner side of the tire mold piece, wherein both end portions of the slit are situated in a portion corresponding to the land portion of a tire defined by a projection or blade forming a tire pattern in vicinity of and without contacting with the projection or blade and the slit is extended to a rear side of the piece, wherein the end portions of the slit are bounded by the tire mold piece.

wherein the width of the slit is equal to or less than 0.1 mm.

6. A piece type tire mold having a plurality of tire mold pieces according to any one of claims 1 to 3, and 5 arranged in the circumferential direction of a tire.

* * * * *